US008769520B2

(12) United States Patent
Cudak et al.

(10) Patent No.: US 8,769,520 B2
(45) Date of Patent: Jul. 1, 2014

(54) CALENDAR AWARE ADAPTIVE PATCHING OF A COMPUTER PROGRAM

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/529,571

(22) Filed: Jun. 21, 2012

(65) Prior Publication Data

US 2013/0346955 A1    Dec. 26, 2013

(51) Int. Cl.
*G06F 9/44*    (2006.01)

(52) U.S. Cl.
USPC ............................................................ 717/168

(58) Field of Classification Search
CPC ....................................................... G06F 8/65
USPC ............................................................. 717/168
See application file for complete search history.

(56) References Cited

U.S. PATENT DOCUMENTS

| | | | |
|---|---|---|---|
| 6,360,366 B1 * | 3/2002 | Heath et al. | 717/178 |
| 7,870,547 B2 * | 1/2011 | Schuft et al. | 717/168 |
| 2008/0028392 A1 * | 1/2008 | Chen et al. | 717/175 |
| 2009/0089777 A1 * | 4/2009 | Fuller et al. | 717/174 |
| 2013/0137430 A1 * | 5/2013 | Coppinger et al. | 455/435.1 |
| 2014/0007117 A1 * | 1/2014 | Sima et al. | 718/102 |

\* cited by examiner

*Primary Examiner* — Philip Wang
(74) *Attorney, Agent, or Firm* — Steven M. Greenberg, Esq.; CRGO Law

(57) ABSTRACT

Embodiments of the present invention provide a method, system and computer program product for calendar aware adaptive patching of a computer program. In an embodiment of the invention, a method for calendar aware adaptive patching of a computer program has been provided. The method includes selecting a patch for updating a computer program and accessing a calendar of events corresponding to an end user of the computer program. The method additionally includes restricting a time for installation of the patch according to events scheduled in the calendar of the identified end user. For instance, the installation of the patch can be restricted from a time from during which a meeting has been scheduled for the end user or from a time during which a presentation has been scheduled for the end user and when the computer program is associated with presentation management.

12 Claims, 2 Drawing Sheets

CALENDAR AWARE ADAPTIVE PATCHING OF A COMPUTER PROGRAM

BACKGROUND OF THE INVENTION

1. Field of the Invention

The present invention relates to software lifecycle maintenance and more particularly to patch scheduling for a computer program.

2. Description of the Related Art

The process of software development begins with functional specification of a computer program leading to the source coding, compilation, arrangement and construction of different components of the computer program. Thereafter, the computer program can be tested, refined and deployed into the field for use by the end user. However, the process of software development does not end with deployment. Rather, the software lifecycle proceeds with the maintenance of the computer program in terms of error corrections, enhancements, updates and upgrades. Modifying a computer program already deployed into the field, then, often requires a process known as patching in which portions of the computer program affected by an error correction, enhancement, update or upgrade can be replaced or modified with new program code.

In the most opportune circumstance, patching a computer program requires little more than the end user permitting an automated process of retrieving the patch in the form of one or more files, possibly from over a computer communications network, temporarily storing the patch in local storage, replacing selected files for the computer program with the files of the patch, and applying any necessary configuration changes to the computer program. However, the patching process often times can be intrusive and resource intensive. Consequently, in many circumstances the end user can direct the delay or avoidance of a requisite patch. As such, to force the installation of a patch, in some circumstances the end user is given no choice as to permit the patching of a computer program, even if at a time when the consumption of computing resources will inhibit the effective use of the computer of the end user.

BRIEF SUMMARY OF THE INVENTION

Embodiments of the present invention address deficiencies of the art in respect to software patching and provide a novel and non-obvious method, system and computer program product for calendar aware adaptive patching of a computer program. In an embodiment of the invention, a method for calendar aware adaptive patching of a computer program has been provided. The method includes selecting a patch for updating a computer program and accessing a calendar of events corresponding to an end user of the computer program. The method additionally includes restricting a time for installation of the patch according to events scheduled in the calendar of the identified end user. For instance, the installation of the patch can be restricted from a time from during which a meeting has been scheduled for the end user or from a time during which a presentation has been scheduled for the end user and when the computer program is associated with presentation management.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for calendar aware adaptive patching of a computer program. In accordance with an embodiment of the invention, a patch to a computer program can be selected to patch an installed computer program in a computer system. An end user utilizing the computer program can be identified and a calendar consulted for the end user. Thereafter, installation requirements for the patch can be determined and compared to scheduled events in the calendar to determine an optimal period of time during which the patch is to be applied to the computer program. For example, a duration of time required to install the patch can be compared to a free block of time in the calendar so as to identify an optimal time during which the patch is to be applied. Conversely, the time during which the end user has scheduled a presentation using the computer system can be avoided for scheduling the patching of the computer program. Finally, the patch can be applied to the computer program during the optimal period of time.

Figure 1:
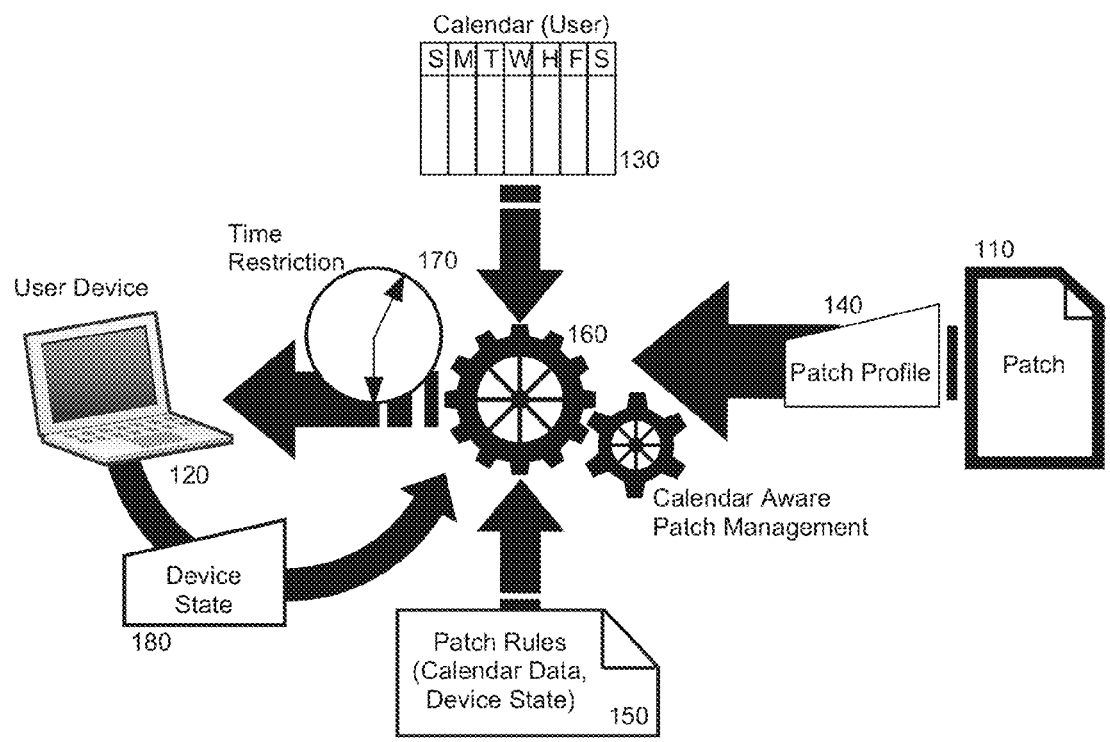
FIG. 1 is a pictorial illustration of a process for calendar aware adaptive patching of a computer program.

In further illustration, FIG. 1 pictorially shows a process for calendar aware adaptive patching of a computer program. As shown in FIG. 1, a patch 110 can be selected for application to a computer program installed in an end user device 120. Calendar aware patch management logic 160 can determine a profile 140 for the patch 110 such as an amount of time necessary to apply the patch 110, disk space requirements, bandwidth requirements to transmit the patch 110 over a network to the user device 120, and the like. An end user additionally can be identified for the end user device 120 and one or more calendar entries in a calendar 130 can be retrieved for the identified end user.

Of note, the calendar entries in the calendar 130 can indicate different scheduled times when applying the patch 110 would be disruptive, such as when the end user device 120 is likely to be used for presenting a presentation, or when the end user device 120 is expected to be in a location where network bandwidth may be limited. Thereafter, patch rules 150 can be used to determine a time restriction 170 when the patch 110 can be applied to the computer program in the end user device 120 without causing unnecessary disruption. The calendar aware patch management logic 160 subsequently can limit the application of the patch 110 to the computer program in the end user device 120 in accordance with the time restriction 170.

Optionally, the calendar aware patch management logic 160 can retrieve a device state 180 for the end user device 120. The device state 180 can be compared to the patch profile 140 in order to determine whether or not the end user device 120 is able to accommodate the patch 110. For example, the device state 180 can indicate whether or not the end user device 120 has sufficient disk space to receive the files of the patch 110, or whether the processor and memory utilization of the end user device 120 is sufficient to accommodate the application of the patch 110. To the extent resources are lacking in the end user device 120, calendar aware patch management logic 160 can schedule a pre-patch stage of applying the patch 110 during the determined time restriction 170 during which resources can be freed, and a patch stage of applying the patch 110 after the determined time restriction 170 when the patch 110 can be applied to the computer program.

Figure 2:
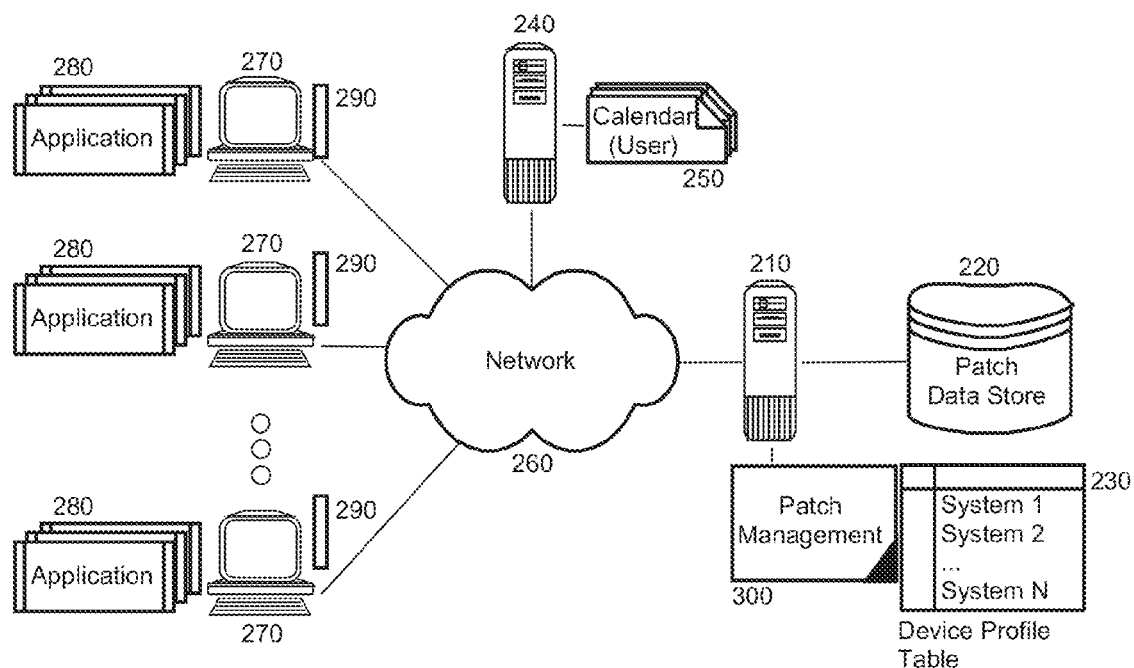
FIG. 2 is a schematic illustration of a computer data processing system configured for calendar aware adaptive patching of a computer program; and, FIG. 3 is a flow chart illustrating a process for calendar aware adaptive patching of a computer program.

The process illustrated in connection with FIG. 1 can be implemented in to computer data processing system. In yet further illustration, FIG. 2 is a schematic illustration of a computer data processing system configured for calendar aware adaptive patching of a computer program. The system can include a host computer 210 configured for communicative coupling to different client computing devices 270 over computer communications network 260. Each of the client computing devices 270 can support the execution in memory of different applications 280 by one or more processors of the client computing device 270 and can provide an interface 290 through which the operational resources of the client computing devices 270 can be ascertained such as processor and memory usage and available disk space. The host computer 210 also can be coupled to a computing system of one or more computers supporting a C&S system 240 managing different calendars 250 for different end users into which different events are scheduled including meetings, tasks and appointments.

The host computer 210 itself can include at least one processor and memory and can support the execution therein of a patch management module 300. The patch management module 300 can include program code that when executed in the memory of the host computer 210 can identify a target one of the client computing devices 270 to which a patch in a coupled patch data store 220 is to be applied, determine an end user for the target one of the client computing devices 270, retrieve one of the calendars 250 corresponding to the determined end user and apply the patch to the target one of the client computing devices 270 only when the application of the patch is not disruptive to the use of the target one of the client computing devices 270 during a scheduled meeting, task or appointment in the retrieved one of the calendars 250.

As a further aspect of the embodiment illustrated in FIG. 2, a device profile table 230 can be maintained indicating a resource configuration and status for each of the client computing devices 270. The device profile table 230 can be populated for each of the client computing devices 270 from data retrieved through each corresponding interface 290 through which the operational resources of the client computing devices 270 can be ascertained such as processor and memory usage and available disk space. The patch management module 300 can utilize the device profile table 230 to determine whether or not the target one of the client computing devices 270 can support the resource requirements of the patch.

To the extent that the patch management module 300 determines that resources in the target one of the client computing devices 270 are not sufficient, a pre-patch phase during which resources can be freed can be scheduled for the target one of the client computing devices 270 at a time when applying the patch is not permitted according to the retrieved one of the calendars 250. Subsequently, the patch can be applied subsequent to the pre-patch phase at a time when the application of the patch is not disruptive to the use of the target one of the client computing devices 270 during a scheduled meeting, task or appointment in the retrieved one of the calendars 250.

Alternatively, to the extent that the patch management module 300 determines that resources in the target one of the client computing devices 270 are not sufficient, a pre-patch phase during which resources can be freed can be scheduled for the target one of the client computing devices 270 at a time preceding a scheduled meeting, task or appointment in the retrieved one of the calendars so as to not disrupt the scheduled meeting, task or appointment. Subsequently, the patch can be applied subsequent to the pre-patch phase during the scheduled meeting, task or appointment in the retrieved one of the calendars 250.

Figure 3:
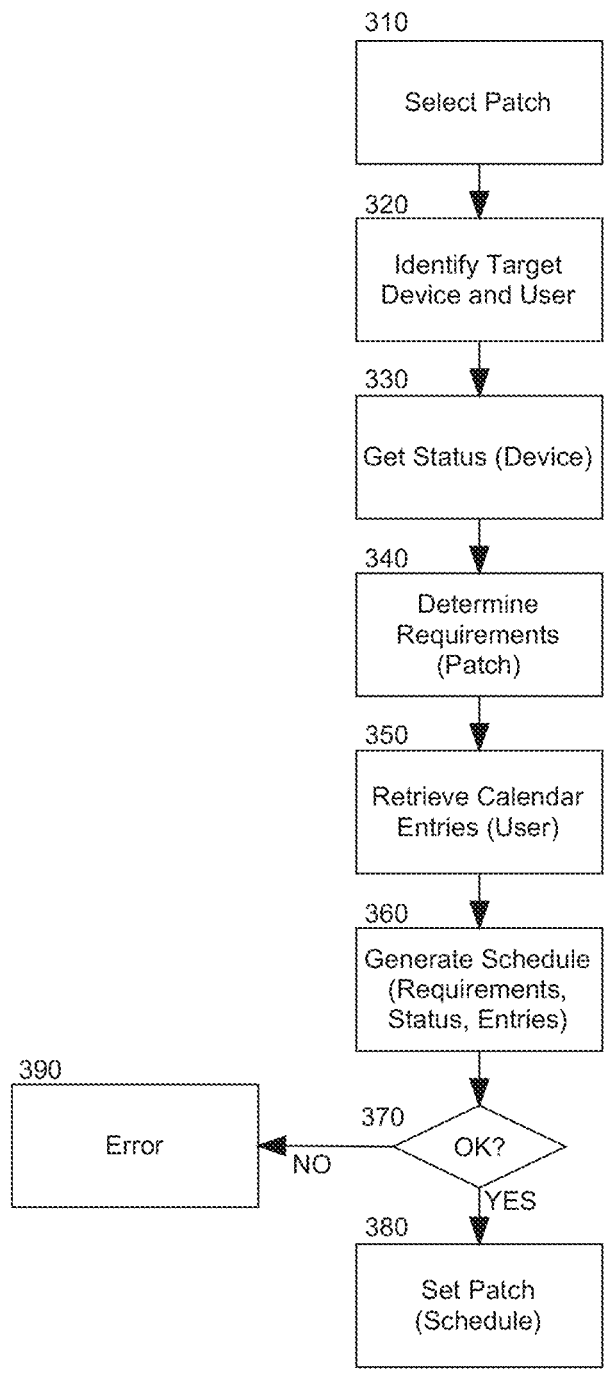

In yet further illustration of the operation of the patch management module 300, FIG. 3 is a flow chart illustrating a process for calendar aware adaptive patching of a computer program. Beginning in block 310, a patch can be selected and in block 320 a target client computing device can be selected to receive application of the patch. Further, in block 320 an end user associated with the selected target client computing device can be determined. In block 330, a device status can be determined for the target client computing device, such as available disk space, available memory, processor usage and the like. In block 340, the resource requirements and installation requirements for the patch can be determined including required disk space, memory, processor usage as well as an estimated duration of time requisite to install the patch.

In block 350, one or more different calendar entries for the determined end user can be retrieved indicating, in particular, when the end user has scheduled a meeting, and especially, when the end user has scheduled a meeting at a location known to lack sufficient network connectivity, or when the end user has scheduled a meeting during which the end user is to deliver a presentation using a presentation application in the target client computing device. Thereafter, in block 360 application of the patch can be scheduled for the target client computing device at a time that does not conflict with the scheduled meetings of the end user and when the end user is known to be in a location providing sufficient network connectivity to support the retrieval of necessary files of a network connection to support the application of the patch.

In decision block 370, it can be determined whether or not the calendar entries of the end user permits application of the patch at a scheduled time and also whether or not the target client computing device enjoys sufficient resources necessary to apply the patch or whether sufficient resources can be acquired through a pre-patch process that may include disk maintenance, file deletion of temporary files, or termination of lower priority processes in the target client computing device. If not, an error condition can result in block 390. Otherwise, in block 380 the patch can be scheduled for application to the target device at a time permitted by the calendar entries along with the scheduling of any pre-patch processing as may be required.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A patch management data processing system configured for calendar aware adaptive patching of a computer program, the system comprising:
   a host computer with memory and at least one processor and communicatively coupled to a calendaring and scheduling (C&S) system managing a calendar of events for an end user; and,
   a patch scheduling module executing in the memory of the host computer, the module comprising program code configured for:
   selecting a patch for updating a computer program;
   accessing a calendar of events corresponding to an end user of the computer program; and,
   restricting a time for installation of the patch according to events scheduled in the calendar of the identified end user.

2. The system of claim 1, wherein the installation of the patch is restricted from a time from during which a meeting has been scheduled for the end user.

3. The system of claim 1, wherein the installation of the patch is restricted from a time from during which a presentation has been scheduled for the end user and when the computer program is associated with presentation management.

4. The system of claim 1, wherein the installation of the patch is restricted from a time from during which a meeting has been scheduled for the end user at a location where network connectivity is known to be bandwidth limited.

5. The system of claim 1, wherein the installation of the patch is partitioned into pre-patch and patch segments and the pre-patch segment is permitted to proceed during a time when a meeting has been scheduled, but the patch segment is permitted to proceed only after the time when the meeting has been scheduled.

6. The system of claim 1, wherein the installation of the patch is partitioned into pre-patch and patch segments and the pre-patch segment is permitted to proceed only prior to a time when a meeting has been scheduled, but the patch segment is permitted to proceed during the time when the meeting has been scheduled.

7. A computer program product for calendar aware adaptive patching of a computer program, the computer program product comprising:
   a computer readable storage medium having computer readable program code embodied therewith, the computer readable program code comprising:
   computer readable program code for selecting a patch for updating a computer program;
   computer readable program code for accessing a calendar of events corresponding to an end user of the computer program; and,
   computer readable program code for restricting a time for installation of the patch according to events scheduled in the calendar of the identified end user.

8. The computer program product of claim 7, wherein the installation of the patch is restricted from a time from during which a meeting has been scheduled for the end user.

9. The computer program product of claim 7, wherein the installation of the patch is restricted from a time from during which a presentation has been scheduled for the end user and when the computer program is associated with presentation management.

10. The computer program product of claim 7, wherein the installation of the patch is restricted from a time from during which a meeting has been scheduled for the end user at a location where network connectivity is known to be bandwidth limited.

11. The computer program product of claim 7, wherein the installation of the patch is partitioned into pre-patch and patch segments and the pre-patch segment is permitted to proceed during a time when a meeting has been scheduled, but the patch segment is permitted to proceed only after the time when the meeting has been scheduled.

12. The computer program product of claim 7, wherein the installation of the patch is partitioned into pre-patch and patch segments and the pre-patch segment is permitted to proceed only prior to a time when a meeting has been scheduled, but the patch segment is permitted to proceed during the time when the meeting has been scheduled.

* * * * *